United States Patent
Nicolai et al.

(10) Patent No.: US 10,322,551 B2
(45) Date of Patent: Jun. 18, 2019

(54) 3-DIMENSIONAL HIGH-STRENGTH FIBER COMPOSITE COMPONENT AND METHOD FOR PRODUCING SAME

(71) Applicant: HP PELZER HOLDING GMBH, Witten (DE)

(72) Inventors: Norbert Nicolai, Schermbeck-Gahlen (DE); Reimund Piatkowski, Dortmund (DE); Lino Mondino, Cuneo (IT); Heinrich Grimm, Bad Salzdetfurth (DE); Volkmar Schulze, Schierling (DE)

(73) Assignee: Adler Pelzer Holding GMBH (DE)

( * ) Notice: Subject to any disclaimer, the term of this patent is extended or adjusted under 35 U.S.C. 154(b) by 0 days.

(21) Appl. No.: 15/542,278

(22) PCT Filed: Jan. 6, 2016

(86) PCT No.: PCT/EP2016/050126
§ 371 (c)(1),
(2) Date: Jul. 7, 2017

(87) PCT Pub. No.: WO2016/113159
PCT Pub. Date: Jul. 21, 2016

(65) Prior Publication Data
US 2017/0348921 A1 Dec. 7, 2017

(30) Foreign Application Priority Data

Jan. 12, 2015 (DE) .................. 10 2015 200 275

(51) Int. Cl.
*B29C 70/48* (2006.01)
*B29B 11/16* (2006.01)
(Continued)

(52) U.S. Cl.
CPC .............. *B29C 70/48* (2013.01); *B29B 11/16* (2013.01); *B29C 70/12* (2013.01); *B29C 70/305* (2013.01);
(Continued)

(58) Field of Classification Search
CPC ..................................................... B29C 70/48
(Continued)

(56) References Cited

U.S. PATENT DOCUMENTS 5,192,387 A   3/1993   Buckley
5,229,052 A   7/1993   Billiu
(Continued)

FOREIGN PATENT DOCUMENTS

DE   2 145 442 A1   3/1973
DE   2 300 269 A1   7/1974
(Continued)

OTHER PUBLICATIONS

"Understanding the Flocking Process." <http://www.swicofil.com/flock.html> Available Feb. 13, 2008.*
(Continued)

*Primary Examiner* — Matthew J Daniels
*Assistant Examiner* — Hana C Page
(74) *Attorney, Agent, or Firm* — Seth L. Hudson; Clements Bernard Walker PLLC

(57) ABSTRACT

A 3-dimensional high-strength fiber composite component having isotropic fiber distribution, comprising 25 to 70 wt % of high-strength, high-modulus fibers, up to 5 wt % of binding fibers, and 25 to 70 wt % of thermosetting or thermoplastic matrix. The invention further relates to a method for producing same, comprising the following steps: preparing the fibers by opening the fibers by releasing the fibers from fiber bundles, bales, or textile structures; sucking and/or blowing the opened fibers onto a three-dimensional, (Continued)

air-permeable tool half having the contour of this side of the component in an interactively controlled manner; pre-solidifying the obtained fiber molding in the flock box; transferring the fiber molding onto a pressing tool in the form of the contour of the air-permeable tool half of the component; bringing into contact with at least one liquid plastic; and solidifying the fiber molding by pressing in order to form a component.

10 Claims, 1 Drawing Sheet

(51) Int. Cl.
  *B29C 70/30* (2006.01)
  *B29C 70/12* (2006.01)
  *B29K 105/12* (2006.01)
  *B29K 307/04* (2006.01)
  *B29K 309/08* (2006.01)

(52) U.S. Cl.
  CPC ...... *B29K 2105/12* (2013.01); *B29K 2307/04* (2013.01); *B29K 2309/08* (2013.01)

(58) Field of Classification Search
  USPC .......................................................... 156/242
  See application file for complete search history.

(56) References Cited

U.S. PATENT DOCUMENTS

| | | | |
|---|---|---|---|
| 6,610,229 B1 | 8/2003 | Morales et al. | |
| 6,929,770 B2* | 8/2005 | Caldwell, Jr. | B29C 70/48 264/102 |
| 7,357,888 B2* | 4/2008 | Michael | B29C 70/305 239/8 |
| 2005/0196582 A1* | 9/2005 | Fleckenstein | C04B 41/81 428/95 |
| 2007/0141926 A1* | 6/2007 | Benim | B29C 55/06 442/2 |
| 2015/0375422 A1* | 12/2015 | Guha | B29B 11/16 264/503 |
| 2017/0050393 A1* | 2/2017 | Duclos | B29C 43/34 |

FOREIGN PATENT DOCUMENTS

| | | |
|---|---|---|
| DE | 44 30 961 A1 | 3/1996 |
| DE | 697 01 148 T2 | 9/2000 |
| DE | 10 2004 003 749 A1 | 8/2005 |
| DE | 10 2005 004 454 B3 | 10/2006 |
| DE | 10 2008 013 808 A1 | 9/2009 |
| DE | 10 2009 048 001 A1 | 4/2011 |
| DE | 10 2011 078 709 A1 | 1/2013 |
| DE | 10 2011 120 986 A1 | 6/2016 |
| EP | 0 587 283 A1 | 3/1994 |
| EP | 0 909 619 B1 | 1/2000 |
| EP | 0 704 287 B1 | 6/2001 |
| EP | 2 543 494 A2 | 1/2013 |
| EP | 2 305 869 B1 | 6/2013 |
| EP | 2 108 497 B1 | 12/2013 |
| WO | 93/20994 A1 | 10/1993 |
| WO | 2005/030462 A2 | 4/2005 |
| WO | 2007/016879 A1 | 2/2007 |
| WO | 2014/053505 A1 | 4/2014 |

OTHER PUBLICATIONS

English Translation of Foerster (EP2305869), Jul. 2018.*
International Search Report for International Application No. PCT/EP2016/050126 dated Apr. 4, 2016.

* cited by examiner

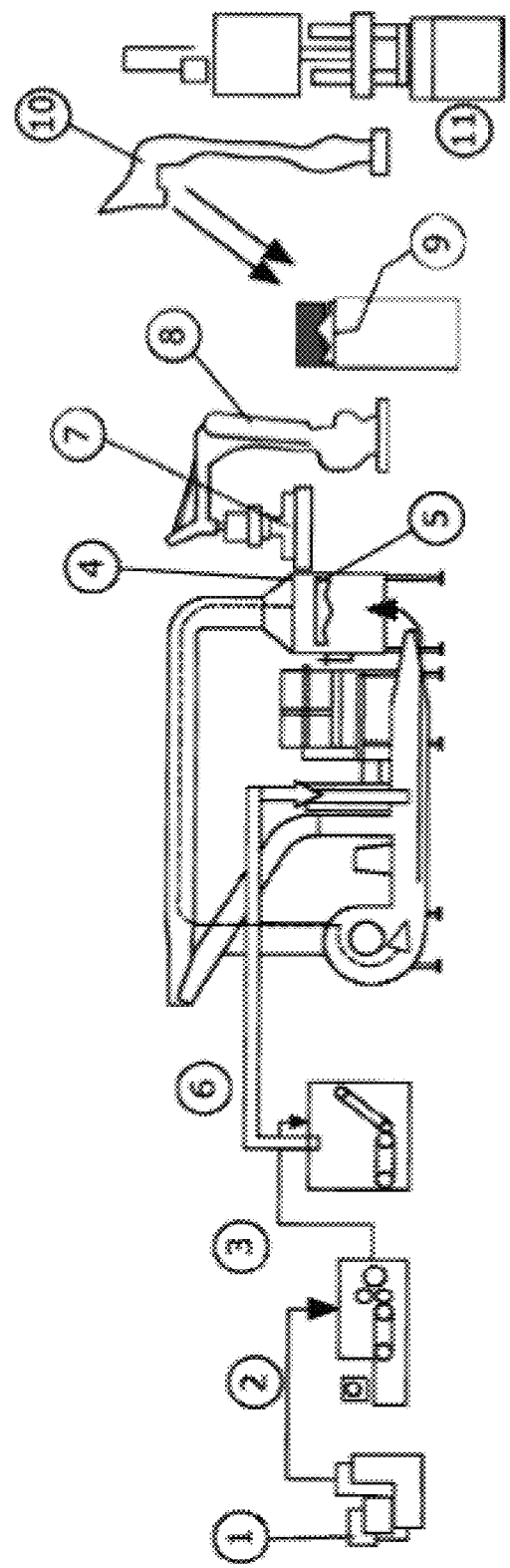

3-DIMENSIONAL HIGH-STRENGTH FIBER COMPOSITE COMPONENT AND METHOD FOR PRODUCING SAME

FIELD OF THE INVENTION

The present invention relates to a three-dimensional high-strength fiber composite component and a method for producing same.

BACKGROUND OF THE INVENTION

For the production of components of fiber-reinforced plastic materials, various methods are known that are, in part highly, different in terms of their properties and the required technology.

Depending on the intended application, it is always necessary to find a compromise between the desired lightweight construction, the properties to be achieved, and economic efficiency.

This is because, on the one hand, the high-strength, high-modulus fibers employed, for example, the carbon (C) fibers or glass fibers (GF), are very cost-intensive; on the other hand, the methods such as prepreg technology, hand lay-up method or autoclave manufacturing are very time-consuming and difficult to automate because of a high degree of manual production, and lead to expensive semi-finished products.

These methods have the disadvantage that textile sheets, woven fabrics, mats, braids or knitted fabrics have to be prepared first in a complicated process, and then have to be soaked with resin for the prepreg method, are cut and laid. On the other hand, relatively large waste cuttings are obtained. A complicated storage is necessary in order to avoid curing and depolymerization.

The further processing may take place in hot-press technology or autoclave technology.

Another solution for producing oriented fiber composite components is the winding technique, in which the material is wound around a mandrel. Such a method is known, for example, from DE 10 2004 003 749 A1. A drawback of the winding technique is the limitation to components with convex surfaces. DE 10 2011 078 709 A1 describes a method in which the shape of the core can be changed after winding.

For large-scale production, the conflict between lightweight construction with carbon fibers on the one hand and the cost for the use of CFRPs on the other hand is particularly clear. In addition to the material price, it is mainly the time-intensive technologies that make series production difficult.

For the automotive industry, for example, it is essentially the production cost that is to be lowered according to Prof. Ferkel [Prof. Dr. H. Ferkel, CCeV Automotive Forum 2010, Jun. 24, 2010, Fiber Composite Materials as an Economic Option for Large-Scale Production].

Methods with a high fiber orientation, which allow for a higher automation, are limited to simple components (winding, pultrusion methods).

Methods suitable for series production, such as injection molding, SMC, GMT and LFT, make use of the fibers' potential only partially.

The properties of the components are determined, on the one hand, by the kind of fibers, the fiber arrangement, the fiber proportion, the fiber length and the fiber orientation and, on the other hand, by the matrix material and the interaction of the fibers with the matrix material.

DE 2 145 442 A and DE 2 300 269 A, which is based on the former, describe a preshaped part of fiber material as well as a method and a device for the production thereof. In particular, a preshaped part is created that can be used for the production of fiber-reinforced objects in a mat shape, such as kettles, tanks or the like; in this case, the fibers of the preshaped part are to be distributed uniformly along the entire wall surface. The device for performing the method is a perforated mold that is rotated around its longitudinal axis, and to the interior of which a vacuum is applied. Two chopping means cut the reinforcing fiber material, for example, glass fibers, into short fiber pieces, and direct the fibers onto the rotating mold. The vacuum applied to the perforated mold causes an arbitrary orientation of the fibers. Since the mold rotates with respect to the chopping tool while the latter is moved along the mold to apply the fibers thereto, the predominant orientation of the fibers runs helically around the perforated mold. Thus, the method is not suitable for producing geometric "three-dimensional" objects, because a high proportion of cuttings would be discarded. In addition, the method is not suitable for producing objects with partially different weights per unit area, either.

EP 0 587 283 A1 describes a fiber preform in which a binder and chopped fibers are blown from corresponding nozzles onto a screen. At the same time, heated air is blown from a plurality of further nozzles onto the forming fiber preform to cure the binder. WO 93/20994 A describes a method for producing a fiber preform in which a powdery binder on chopped glass fibers that are on a preforming screen is described. The powdery binder and the chopped glass fibers are then heated to soften the particles of the binder, whereby the latter adheres to the glass fibers to form the preform.

WO 2005 030 462 A2 describes an apparatus and a method for producing fiber preforms in which fibers and binder have been disperses hot on a surface such that the materials are conditioned and then solidified on the surface. The raw materials of the fiber preform contain reinforcing fibers, which are mixed with binder, especially thermoplastic or thermoset materials. Subsequently to the application to the surface, the fibers are further heated, cooled and solidified. This produces a fiber preform in the form of an open mat having interstices between the reinforcing fibers. The deposited mat can also be shaped further into a final desired shape before complete solidification.

DE 10 2011 120 986 A1 describes an injection molding process for manufacturing a fiber composite component in which a core of the component is cast at first in a first mold. Then, fiber material is soaked with plastic, and the soaked fiber material is wound around the cast core. Subsequently, heat is applied to the core with the wound material in a second injection mold, whereby the fiber material is fixed. Then, the core-filled hollow profile is demolded, and the core is molten out of the hollow profile by heating.

EP 2 543 494 A2 also describes a process for producing a component of fiber-reinforced plastic. At first, a core is provided in a fiber application device. Then, fibers impregnated with a plastic matrix are applied to the core. The plastic matrix is cured in one process step by applying pressure and/or heat to the fibers. According to EP 2 543 494 A2, the core can be provided with a surface comprising a shape-variable portion.

In the production of such conventional three-dimensional components, it may occur that cavities are formed perpendicularly to the direction of the fibers, caused by drawing uniaxial fibers perpendicularly to the direction of the fibers.

Such cavities are then filled by the plastic material. These regions then have a significantly lower strength than that of the reinforced regions, leading to worse material properties.

In contrast, it is known that non-wovens have the best deformation behavior, i.e., they are best suitable for being adapted to a desired contour. But also in non-wovens, the highest dilution of material takes place during the shaping in the regions with the highest deformation. This means that strength properties of the component are determined by the geometry of the component even if a conventionally produced non-woven is used.

In addition, in the production of components made of non-woven with a stronger deformation, it may occur that the non-woven is shifted from the periphery into more interior areas when the mold is being closed.

Therefore, a significant improvement is offered by fiber preforms in which the fibers employed are directly placed into a three-dimensional mold, and only then are solidified.

For insulations in the floor and bulkhead regions of vehicles, a wide variety of fiber injection methods for producing fiber non-woven parts are known that avoid many of the mentioned problems.

EP 0 909 619 B1 describes an invention for the discontinuous manufacture of shaped composite materials. In this method, a mixture of fibers is sucked onto a perforated drum having the shape of the component. The thickness of the component is defined by skim rollers. In a final step, the component is solidified by heat. In this method, a problem arises in the adjustment of different weights per unit area for the defined adjustment of the local flow resistance.

EP 2 305 869 B1 (WO 2014/053505 A1) describes a process in which mixtures of fibers are blown through one or more blowing apertures into a mold. Subsequently, the material is solidified by heat. For stiff fibers, such as carbon or glass fibers, this method represents a possible cause of fiber breaking during the solidification because of the more or less non-two-dimensional arrangement of the fibers.

EP 0 704 287 B1 is a method for producing fiber mixtures in which a semifinished product is prepared by an air layering method. In a second step, this semifinished product is pressed as a hot component in a second mold, and cooled.

WO 2007/016879 A1 describes a combined blow-forming method in which the mold has two broad side walls, at least one side wall being contoured. The fiber mixture is blown into this mold, and sucked off sector by sector. The fiber blank is withdrawn by a take-off device and solidified. In this case too, the not solely two-dimensional arrangement of the fibers is a drawback for carbon and glass fibers.

DE 10 2005 004 454 B3 describes a method for the preparation of textile molded parts. In this method, fibers with a dissimilar layer thickness are collected to form a blank and sucked into a mold that has the shape of the blank and air-permeable walls.

EP 2 108 497 B1 describes a method for producing component parts in which a fiber mixture of fibers and binding fibers is blown/sucked against gravity into an air-permeable flock tool with the one-sided contour of the component part.

In all of these methods, released fibers are conveyed by sucking and/or blowing to the desired place in an air-permeable tool. For this application, the fibers employed comprise from 60% by weight to 85% by weight higher-melting one-component fibers, and from 15% by weight to 40% by weight of binding fibers.

According to the invention, mainly bico fibers (bicomponent fibers, for example, with a high-melting core and a low-melting shell) based on PET as the core and CoPET as the shell are employed as binders. Other shell materials on the basis of PE or PP are also known.

The material is partially or completely bonded by heating with air. If the non-woven component is only partially bonded, post-solidification is performed in a heated tool.

For components made of carbon fibers, such methods for producing fiber preforms are neither known nor employed. Since the fiber preforms have a low solidification, the methods for bonding the fibers into a plastic matrix can be applied only conditionally.

BRIEF SUMMARY OF THE INVENTION

Therefore, it is the object of the present invention to provide a method for preparing a three-dimensional fiber composite component with a charge-dependent material distribution with stiff high-modulus fibers and a plastic matrix in very short cycle times.

According to the invention, this object is achieved by a method for producing a three-dimensional fiber composite component according to claim 1.

BRIEF DESCRIPTION OF THE DRAWINGS

The present invention is illustrated and described herein with reference to the various drawings, in which like reference numbers denote like method steps and/or system components, respectively, and in which:

FIG. 1 is an illustration of schematic of the basic principle of the method of the present invention.

DETAILED DESCRIPTION OF THE DRAWINGS

The invention is based on the knowledge that, by the controlled blowing and/or sucking of released fibers, with or without binding fibers, into a three-dimensional air-permeable mold, it is possible to provide a fiber preform in which the fibers are arranged on a three-dimensional molded part in such a way that they are almost isotropic in the longitudinal and transverse directions of the mold, and the fiber preform has a uniform, or deliberately locally non-uniform, weight per unit area. The contour of the air-permeable mold essentially corresponds to the contour of the upper or lower side of the component.

In a first embodiment, the present invention relates to a method for producing a three-dimensional fiber composite component with an isotropic fiber distribution with a charge-dependent material distribution made of stiff high-modulus fibers and a plastic matrix in very short cycle times, comprising the following steps in the given order:

- fiber preparation 1, 2, 3 by opening the fibers by releasing the same from fiber bundles, bales or textile structures;
- interactively controlled sucking and/or blowing 6 of the opened released fibers onto a three-dimensional air-permeable half mold 5 with the contour of this side of the component;
- preliminarily solidifying the fiber preform in the flockbox 4;
- transferring the fiber preform 7 to a pressing mold 11 in the form of the contour of the air-permeable half mold 5 of the component;
- contacting 10 with at least one liquid plastic material;
- solidifying the fiber preform by pressing 11 into a component.

By the combination of these steps, a three-dimensional component with an isotropic fiber distribution and partially different weight per unit area can be prepared with almost complete avoidance of defects in the fiber structure, and with a very short cycle time. The productivity is significantly improved thereby as compared to known methods.

As said fibers, high strength or high-modulus fibers, especially glass fibers or carbon fibers, are employed; however, natural fibers, plastic fibers or other inorganic fibers may be additionally used.

It is possible to use both sorted fibers and fiber mixtures of fibers with similar or clearly different melting points.

In another embodiment, the fibers are mixed with at least one binding fiber after the opening. The "opening of the fibers" means the releasing of the fibers from fiber bundles, bales or other textile structures (fiber preparation).

According to a first alternative, the mass proportion of the binding fibers, based on the total fiber mass, after the mixing may be, for example, 5% by weight or less than 5% by weight. In this case, the binding fibers merely serve for preliminary solidification. For example, co-polyethylene, co-polyester, co-polyamide or thermoplastic polyurethane (PUR) may be used as the material for the binding fibers. Preferably, binding fibers compatible with the plastic matrix are used.

The introducing of the fibers by blowing/sucking into the mold can be effected in such a way that the fibers have a uniform weight per unit area over the entire surface of the mold.

However, it is also advantageously possible to distribute the fibers during the sucking and/or blowing on a surface of the three-dimensional, air-permeable mold part in such a way that the fibers have locally differing weights per unit area with respect to the surface. Thus, partially reinforced three-dimensional fiber components can be prepared.

Binding fibers to which heated air is applied may also be used for the preliminary solidification of the fiber preform. Other possibilities of preliminary solidification include, for example, liquid binders or needle-bonding with air.

A fiber preform solidified in this way can be transported and later placed onto a pressing mold without falling apart.

In another embodiment, the preliminarily solidified fiber preform that essentially corresponds to the shape of the component can then be applied by means of a transport tray for transfer to a pressing mold.

Further, it is conceivable that uniaxial fiber bundles and/or fabrics are introduced along on at least one surface of the fiber preform when the fiber preform is transferred to the pressing mold. This serves for a charge-dependent reinforcement of the component.

For liquid plastic materials, such as resins (epoxy resin, phenol resin, polyester resin) or casting polyamide (which requires working under an inert atmosphere), the known methods, such as RTM or TRTM, can be applied.

In another embodiment, it is possible to contact, especially to spray, the fiber preform with a liquid plastic material. PUR resin is particularly important in this context. The further processing may then be effected in an autoclaving or pressing method.

The preparation of components with a thermoplastic matrix is preferably effected by the use of a fiber mixture of high melting or non-melting fibers, a binding fiber and the matrix fiber. Higher strength thermoplastic materials, such as polypropylene, different polyamides, polyesters, polyetheretherketone, are applied as matrix fibers. The mass proportion of the plastic fibers (matrix) in the entire fiber mass after the mixing is about 30% by weight to 90% by weight.

For the further processing, the fiber preform is heated and preliminarily solidified at a temperature above the melting temperature of the binding fibers. In another step, it is heated at a temperature above the temperature of the matrix plastic and pressed in a cold pressing mold.

EXAMPLE

In the following, a preferred embodiment of the invention is described with reference to the drawing, wherein FIG. 1 schematically illustrates the basic principle of the method according to the invention for preparing a three-dimensional fiber component using the HMP III fiber flocking technology.

The carbon fiber bales were opened, released and mixed with commercially available 3% by weight PUR bicomponent fibers made of a thermoplastic PUR material core and a thermoplastic copolyurethane shell (1, 2, 3). The melting temperature of the copolyurethane was about 100° C.

In the flockbox 4, there was a closed circulation in the direction of the arrow of cold (room temperature) air.

The released fiber mixture was weighed and introduced 6 into the air flow.

The fibers collected in the filter 5, which essentially had the contour of one side of the component. Regions with different open areas sucked different amounts of material, which resulted in different weights per unit area in the component. Using hot air with a temperature above the melting temperature of the shell material of the bico fibers (in this case 100° C.), the fiber preform was solidified to such an extent that it could be transported.

The fiber preform was removed by means of a removing tray 7 and robot 8, wherein it was retained on the tray by means of a vacuum, and placed in a deposit tray 9 for spraying, sprayed with a second robot 10, and transported into a pressing mold 11, and subsequently pressed and thus solidified.

In another embodiment, the spraying could also be done directly in the pressing mold 11.

A suitable conventional pressing mold could be used as said pressing mold 11.

The thus prepared three-dimensional component had a partially increased weight per unit area in desired regions, and thus different force absorptions and deformation behaviors as desired.

LIST OF REFERENCE SYMBOLS

1-3: Fiber processing
4: Flockbox
5: Filter
6: Air flow
7: Fiber preform
8: Robot
9: Deposit tray
10: Spraying robot
11: Pressing mold

The invention claimed is:

1. A method for producing a three-dimensional high-strength fiber composite component with an isotropic fiber distribution with a charge-dependent material distribution made of stiff high-modulus fibers and a plastic matrix, comprising the following steps in the given order:
   (a) opening carbon fibers by releasing the same from fiber bundles, bales or textile structures;
   (b) mixing of the carbon fibers after the opening with at least one binding fiber, wherein the mass proportion of the binding fibers in the entire fiber mass after the mixing is between about 0 and about 5% by weight;

(c) sucking and/or blowing of the opened released fibers onto a three-dimensional air-permeable half mold with a contour of this side of the three-dimensional high-strength fiber composite component;

(d) activating the binding fibers by heated air for preliminarily solidifying a fiber preform;

(e) transferring the fiber preform to a pressing mold in the form of the contour of the air-permeable half mold of the three-dimensional high-strength fiber composite component;

(f) contacting the fiber preform with at least one liquid plastic material; and (g) solidifying the fiber preform by pressing the preform into the three-dimensional high-strength fiber composite component.

2. The method according to claim 1, characterized in that the fibers are arranged on the surface of said three-dimensional air-permeable mold during the sucking and/or blowing in such a way that the coverage of the fibers has a uniform weight per unit area over the entire surface.

3. The method according to claim 1, characterized in that the fibers are arranged on the surface of said three-dimensional air-permeable mold during the sucking and/or blowing in such a way that the coverage of the fibers has locally different weights per unit area.

4. The method according to claim 1, characterized in that the transfer of said fiber preform to a pressing mold is effected by means of a transport tray, in which the fiber preform is retained by a vacuum.

5. The method according to claims 1, characterized in that uniaxial fiber bundles and/or fabrics are applied to one or both surfaces of the fiber preform.

6. The method according to claim 1, characterized in that one-component fibers of thermoplastic PUR, copolyamide or copolyester is employed as said binding fibers.

7. The method according to claim 1, characterized in that bicomponent fibers with shell materials of thermoplastic PUR, copolyamide or copolyester are employed as said binding fibers.

8. The method according to claim 1, characterized in that resins that are liquid in the application state and made of epoxy resin, polyurethane resin, polyester resin or casting polyamide are employed as matrix materials.

9. The method according to claim 8, characterized in that said resin is sprayed on one or both sides of said fiber preform.

10. The method according to claim 8, characterized in that said resin is injected through nozzles on the mold side into the pressed fiber preform in the closed mold.

\* \* \* \* \*